T. MABBITT, Jr.

Improvement in Butter-Stamps.

No. 126,641.            Patented May 14, 1872.

Witnesses.
Geo. N. Howard.
H. A. Daniels

Truman Mabbitt Jr, Inventor,
by C. S. Whitman Att'y 126,641

UNITED STATES PATENT OFFICE.

TRUMAN MABBETT, JR., OF VINELAND, NEW JERSEY.

IMPROVEMENT IN BUTTER-STAMPS.

Specification forming part of Letters Patent No. 126,641, dated May 14, 1872; antedated April 24, 1872.

SPECIFICATION.

*To all whom it may concern:*

Be it known that I, TRUMAN MABBETT, Jr., of Vineland, in the county of Cumberland and in the State of New Jersey, have invented an Improved Butter-Measure and Stamp; and do hereby declare that the following description, taken in connection with the accompanying plate of drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to implements made use of for measuring, stamping, or weighing butter; and the nature thereof consists in the construction and arrangement of certain parts thereof, as hereinafter shown and described.

Figure 1:
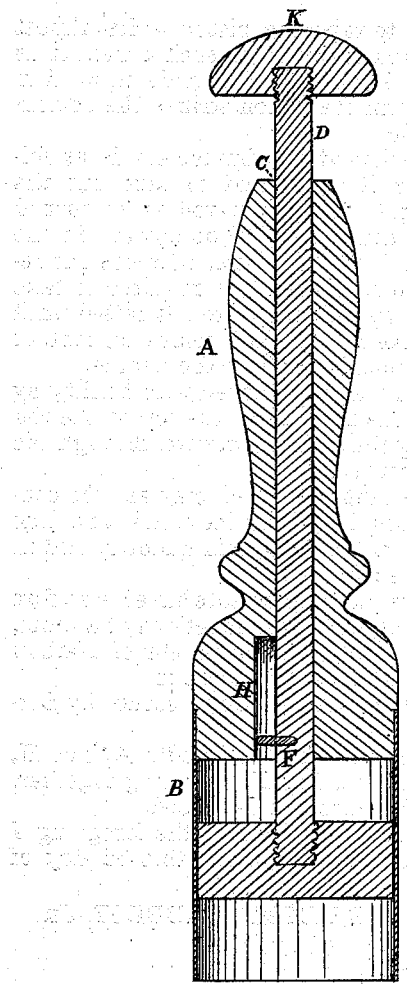
Figure 2:
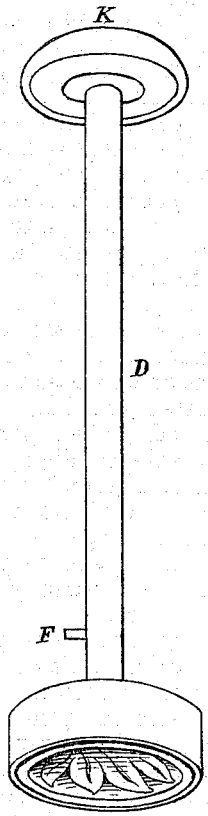

In the accompanying plate of drawing, which illustrates my invention and forms a part of the specification thereof, corresponding parts being designated by similar letters, Figure 1 is a transverse vertical section of the implement. Fig. 2 represents the plunger.

The construction, operation, and relative arrangement of the component parts of my invention are described as follows:

Attached to the periphery of the lower part of the handle A is the cylindrical knife B. The said handle is provided with a tubular aperture, C, through which passes the piston-rod D, attached to the piston, on the under side of which is cut any desired device for stamping the butter. Upon the said piston-rod is the pin or lug F, which catches against the bottom of the handle when the piston is partially raised, and holds it in position. When it is desired to raise the piston to its utmost height, the rod is turned in such a manner as to allow the lug or pin F to slide upward in the slot H until the piston strikes the bottom of the handle.

The operation of the implement is as follows: When it is desired to take out the largest weight, the piston-rod is so turned that the pin thereon will slide upward in the slot H until the said piston assumes the required position. When it is required to take out the less weight, the piston is raised until the pin on the rod thereof comes in contact with the annular bottom of the handle.

The piston may be removed with facility by unscrewing the knob K on the top of the rod and drawing the same downward through the tubular aperture.

The implement described may also be conveniently used in taking ice-cream and like articles from a can in certain quantity and in a presentable shape.

I am aware that implements have heretofore been used combining the functions of a knife, mold, and stamp, (see the patent of Nathan Clough, No. 97,049, of 1869;) but

What I claim, and desire to secure by Letters Patent, is—

The combination of the handle A, slot H, piston-rod D, and lug F, operating together, as and for the purposes described.

In testimony that I claim the foregoing I have hereunto set my hand this 3d day of June, 1871.

TRUMAN MABBETT, JR.

Witnesses:
THEODORE WILES,
GEORGE PEARSON.